Figures 1, 2:
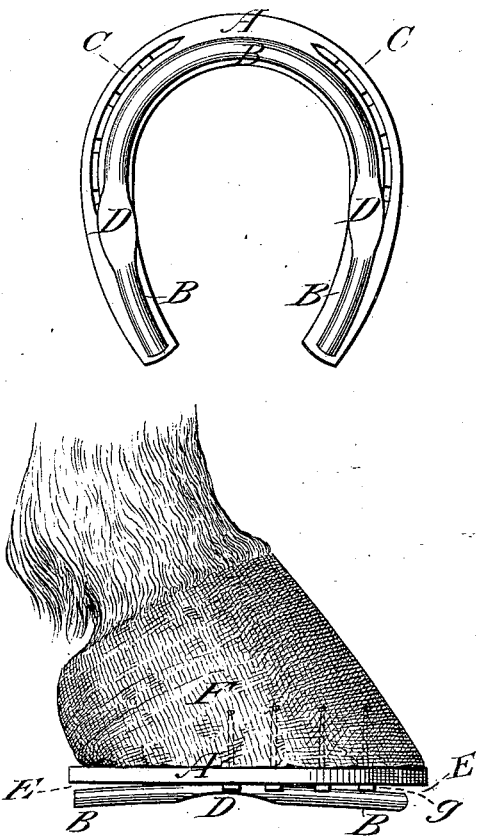

J. C. HAMILTON.
Horseshoe.

No. 207,603.  Patented Sept. 3, 1878.

Attest:
Henry C. Stratton
Charles B. Stratton

Inventor:
John C. Hamilton

UNITED STATES PATENT OFFICE.

JOHN C. HAMILTON, OF FORT WAYNE, INDIANA.

IMPROVEMENT IN HORSESHOES.

Specification forming part of Letters Patent No. 207,603, dated September 3, 1878; application filed July 1, 1878.

*To all whom it may concern:*

Be it known that I, JOHN C. HAMILTON, of the city of Fort Wayne, Allen county, and State of Indiana, have invented a new and useful Improvement in Horseshoes, of which the following is a specification:

The invention consists in a shoe to act as a spring-cushion on a horse's foot when traveling on a hard road, and also to bring the pressure and first jar to the strongest part of the foot, which is the bar or side, and also to assist the horse in raising his foot.

In the accompanying drawing, in which similar letters of reference indicate like parts, Figure 1 is a perspective view of the bottom or part of the shoe which strikes the ground when on the horse. Fig. 2 is a side view, showing it attached to a hoof or foot.

A represents a common shoe; B, a piece of round steel bent the shape of a shoe, and welded at each side at D; letter C, crease for nail-holes; F, the side view of foot. A, Fig. 2, is the shoe nailed to hoof or foot. B, Fig. 2, is the steel spring; and D, Fig. 2, is where it is welded to A. E, Fig. 2, represents the space at the heel and toe, which causes the attachment B to act as a spring. B consisting of round steel, it will not hold dirt or anything in space E, and, being steel, will wear and protect A. It can be attached to any common shoe.

Having thus described my invention, what I claim as new, and desire to secure by Letters Patent, is—

A horseshoe provided with a round steel bar bent to the shape of the shoe, and welded thereto at the sides, as described, and for the purpose set forth.

JOHN C. HAMILTON.

Witnesses:
HENRY C. STRATTON,
CHAS. B. STRATTON.